(12) United States Patent
Jarvinen (10) Patent No.: US 7,785,035 B2
(45) Date of Patent: Aug. 31, 2010

(54) APPARATUS, SYSTEM AND METHOD FOR COLLECTING MATERIAL FROM WATER SYSTEM AND USES OF APPARATUS

(75) Inventor: Markku Jarvinen, Lielax (FI)

(73) Assignee: Oy-Kappelinranta-Kapelstrand AB, Lielax (FI)

( * ) Notice: Subject to any disclaimer, the term of this patent is extended or adjusted under 35 U.S.C. 154(b) by 75 days.

(21) Appl. No.: 11/995,354

(22) PCT Filed: Jul. 17, 2006

(86) PCT No.: PCT/FI2006/000258

§ 371 (c)(1),
(2), (4) Date: Jan. 11, 2008

(87) PCT Pub. No.: WO2007/010086

PCT Pub. Date: Jan. 25, 2007

(65) Prior Publication Data

US 2008/0219771 A1 Sep. 11, 2008

(30) Foreign Application Priority Data

Jul. 15, 2005 (FI) .................................. 20050762

(51) Int. Cl.
*E02B 15/04* (2006.01)
*B63B 35/32* (2006.01)
(52) U.S. Cl. .................. 405/60; 210/242.4; 210/170.11
(58) Field of Classification Search .................. 405/60; 210/242.1, 242.3, 170.05, 170.1, 170.11
See application file for complete search history.

(56) References Cited

U.S. PATENT DOCUMENTS 1,591,024 A * 7/1926 Dodge ...................... 210/242.3

(Continued)

FOREIGN PATENT DOCUMENTS

EP 0 716 188 B1 6/2001

(Continued)

OTHER PUBLICATIONS

International Search Report for PCT/FI2006/000258 mailed Nov. 30, 2006.

(Continued)

*Primary Examiner*—Frederick L Lagman
(74) *Attorney, Agent, or Firm*—Nixon & Vanderhye P.C.

(57) ABSTRACT

The invention relates to an apparatus (20), a system and a method for collecting material from a water system, and the use of the apparatus (20) as an oil-combating device or rescue device. The apparatus (20) can be arranged to float and be moveable on the water surface (1). The apparatus comprises a cargo space (2) for storing the collected material, a collecting platform (12) connected to the cargo space, over which platform the water of the water system and/or material to be collected from it is arranged to pass before passing into the cargo space, water exhaustion means (5) for removing water from the cargo space, means (11) for adjusting the height of the collecting platform as desired in relation to the level of the water surface of the water system, at least one ballast tank (3) to control the draught of the cargo space as desired and/or means (7) for controlling the effect of the water exhaustion means.

12 Claims, 4 Drawing Sheets

U.S. PATENT DOCUMENTS

| | | | |
|---|---|---|---|
| 3,708,070 A | 1/1973 | Bell | |
| 3,727,766 A * | 4/1973 | Horne et al. | 210/242.3 |
| 3,737,040 A | 6/1973 | Brydoy et al. | |
| 3,754,653 A | 8/1973 | Verdin | |
| 3,822,789 A | 7/1974 | Crisafulli | |
| 3,966,614 A | 6/1976 | Ayers | |
| 3,996,615 A | 12/1976 | Nelson et al. | |
| 4,033,876 A * | 7/1977 | Cocjin et al. | 210/242.3 |
| 4,049,554 A | 9/1977 | Ayers | |
| 4,053,406 A | 10/1977 | Deslauriers et al. | |
| 4,128,068 A | 12/1978 | Ogura et al. | |
| 4,139,470 A * | 2/1979 | Stagemeyer et al. | 210/242.3 |
| 4,356,086 A | 10/1982 | Oberg | |
| 4,363,735 A * | 12/1982 | Hook | 405/60 |
| 4,381,994 A | 5/1983 | Ayers | |
| 4,511,470 A | 4/1985 | Ayroldi | |
| 4,595,510 A | 6/1986 | Winbladh et al. | |
| 4,610,635 A | 9/1986 | Austevoll | |
| 5,045,217 A | 9/1991 | Ronan et al. | |
| 5,158,673 A * | 10/1992 | Halter | 210/242.3 |
| 5,207,901 A * | 5/1993 | Ravagnan | 405/60 |
| 5,292,430 A * | 3/1994 | Sullivan et al. | 210/242.3 |
| 5,478,483 A | 12/1995 | Gore | |
| 6,073,382 A * | 6/2000 | Willener | 405/60 |
| 6,905,597 B2 * | 6/2005 | Garbaty et al. | 210/242.3 |
| 7,037,038 B1 * | 5/2006 | Haski et al. | 405/60 |
| 7,452,462 B2 * | 11/2008 | Joliet | 210/242.3 |
| 2006/0104720 A1 * | 5/2006 | Haski et al. | 405/60 |

FOREIGN PATENT DOCUMENTS

| | | |
|---|---|---|
| RU | 2 220 253 | 12/2003 |
| WO | 90/12156 | 10/1990 |
| WO | 03/071035 A1 | 8/2003 |
| WO | WO 2005/097592 | 10/2005 |

OTHER PUBLICATIONS

Finnish Search Report dated Feb. 27, 2006 (1 page).

* cited by examiner

APPARATUS, SYSTEM AND METHOD FOR COLLECTING MATERIAL FROM WATER SYSTEM AND USES OF APPARATUS

This application is the U.S. national phase of International Application No. PCT/FI2006/00258 filed 17 Jul. 2006 which designated the U.S. and claims priority to Finland Patent Application No. 20050762 filed 15 Jul. 2005, the entire contents of each of which are hereby incorporated by reference.

TECHNICAL FIELD OF THE INVENTION

The object of the invention is an apparatus, a system and a method according to the preambles of the independent claims presented below for collecting material from a water system and uses of the apparatus. The invention relates to, for example, a new effective way of controlling oil damages which have taken place and rescuing humans from water systems.

PRIOR ART

The defects of known oil-combating methods are among others a low collecting efficiency, poor functioning in icy water, the often repeated need for cleaning and service due to the brushes and other moving separation parts getting dirty. A great disadvantage of known systems is the low capacity of storing collected oil. There have been remarkable problems with unloading congealed oil. Cleaning oil-polluted shores using the current methods is difficult, slow and inefficient.

Collecting other substances than oil from water systems is also often difficult and slow. For example rescuing humans who have ended up in the water, especially in large waves, is difficult with the current methods.

THE AIM OF THE INVENTION AND BRIEF DESCRIPTION

It is an aim of the present invention to reduce or even eliminate the above-mentioned problems of prior art.

It is a particular aim of the present invention to achieve a new and effective way of collecting various materials from the surface or near the surface of water systems and a new logistics arrangement for effective handling of such collecting.

It is a particular aim of the present invention to achieve an effective way of controlling oil damages and an effective way of rescuing humans who have ended up in a water system.

To attain the above-mentioned purposes, among other things, the apparatus, system and method according to the invention for collecting material from a water system as well as the uses of the apparatus are characterized in what will be presented in the characterizing parts of the appended independent claims.

The exemplary applications and advantages mentioned in this text apply, when applicable, to both the apparatus, the system and the method according to the invention for collecting material from a water system as well as to the uses of the apparatus, even though it is not always specifically mentioned.

A typical apparatus according to the invention for collecting material from a water system is arranged to float and be moveable on the water surface. An apparatus such as this comprises at least:

a cargo space for storing the collected material,
a collecting means for directing the water of the water system and/or material to be collected from it into the cargo space,
water exhaustion means for removing water from the cargo space,
at least one ballast tank to control the draught of the cargo space as desired and/or means for controlling the effect of the water exhaustion means, A typical ballast tank according to the invention is divided into at least two separate sections.

Respectively, a typical method according to the invention for collecting material from a water system comprises at least the following stages:

a cargo space is kept in the water system,
water from the water system and/or material to be collected from it is directed into the cargo space,
water is removed from the cargo space.

The cargo space can for example be a watercraft resembling an ordinary barge, the typical travelling direction of which is in this case also the typical travelling direction of the apparatus. The cargo space can also be a floating storage tank. The collecting means is typically placed in the front of the cargo space in the travelling direction of the apparatus or in connection with its front part. Thereby when the apparatus moves in its typical travelling direction in relation to the water system, the material to be collected automatically comes first to the collecting means or to the vicinity of it. A typical collecting means according to the invention comprises a collecting platform, over which the water of the water system and/or the material to be collected from it is arranged to pass before passing into the cargo space, where the surface of the water and material to be collected is at the same height as the surface of the water system surrounding the cargo space. The purpose of the collecting platform is e.g. to even out the flow of water entering the apparatus or the flow of material to be collected, for example by suppressing the force of the waves. In addition, the amount of water entering the apparatus or material to be collected can be controlled with the placement of the collecting platform in relation to the water surface of the water system. Material to be collected can also be directed onto the collecting platform for example for cleaning.

The means for removing water from the cargo space are for example pumps or so-called propeller passages or simple openings in the rear part of the cargo space, situated beneath the water surface of the water system. The apparatus can be designed so that when it moves in relation to the water system, pressure differences and flows are generated, which draw out water from the openings in the rear part of the cargo space without pumps or other mechanical water exhaustion means. The means for removing water from the cargo space are such as can be closed, if desired, to prevent flows.

The device according to the invention is suitable for collecting different materials from water systems. Especially, it is easy to use the invention for collecting materials that are lighter than water or that otherwise are situated near the surface of the water system. The device according to the invention is well suited to be used as an oil-combating vessel, i.e. for collecting oil from a water system. The device according to the invention is well suited to be used as a salvage vessel, i.e. for rescuing humans who have ended up in the water from the water system. Other possible materials to be collected with the aid of the invention are, for example, life rafts, logs and other timber, blue-green algae, various waste matters and bilge water from ships, dead animals such as fish.

It can also be conceived that a device according to the invention could collect oil-stained or dead aquatic animals, such as water birds or fish. If the invention is used for rescuing humans, means can be arranged on the collecting platform or in the cargo space, with the aid of which means it is easier for humans to be rescued. These gripping means for humans are for example various nets, ropes, railings, grate platforms and steps. In apparatuses according to the invention which are meant for rescuing humans, the cargo space is preferably made to suit human use. A salvage vessel for humans does not necessarily need particular means for controlling the draught of the cargo space or means for adjusting the height of the collecting platform. In a salvage vessel for humans, water does not necessarily need to be moved into the cargo space. In an embodiment those that are to be rescued are directed into the cargo space along with the water. There can be rescue platforms in the cargo space to make the salvage work easier.

In a typical apparatus according to the invention, there are means for adjusting the height of the collecting platform as desired in relation to the level of the water surface of the water system. In an embodiment the depth of the collecting platform is adjusted with ballast tanks. In a typical method according to the invention the height of the collecting platform is controlled. Thus it is possible to control the depth from which material to be collected is taken into the cargo space with the water.

In a typical apparatus according to the invention there is at least one ballast tank for controlling the draught of the cargo space as desired and/or means for controlling the effect of the water exhaustion means. If the collecting platform is attached firmly to the cargo space, these means can also be used to control the height of the collecting platform from the water surface. The collecting platform can for example be primarily horizontal when collecting oil. When rescuing humans it may for example be preferable in high sea that the front end of the collecting platform is kept lower than the rear end attached to the cargo space.

By means of the control of the draught of the cargo space, the collecting depth can also be adjusted. By means of the control of the effect of the water exhaustion means, the amount of new water and material to be collected the cargo space can receive can be adjusted. The water to be taken and the material to be collected into the apparatus can be directed from the collecting platform to the cargo space even wholly without pumps or other mechanic means of transport, for example in flowing water or using the water flow caused by the movement of the vessel.

Typically, the necessary means for the function of the ballast tanks have also been arranged in connection with the ballast tanks. Ballast tanks are known to be used for steadying empty or not fully loaded vessels, e.g. cargo vessels. In the present invention, the ballast tanks of the apparatus are unexpectedly used to achieve a suitable draught and position in relation to the surface of the water system when collecting material and especially when unloading the collected material or the load. Ballast tanks are thus in this invention not needed for steadying the passage of the apparatus.

In an embodiment of the invention the ballast tank is divided into two parts, out of which one part is used for adjusting the draught of the cargo space by filling it with a desired amount of water and removing water. The second part is constant and water is not pumped into it nor arranged into it through other means, and it is sufficient to carry a fully loaded cargo space and ensures that the cargo space stays on the surface.

In an embodiment of the invention the ballast tank is divided into two parts essentially in the direction of its elevation, i.e. parallel to the water surface. In that case the lower part is preferably used for adjusting the draught. The ballast tank can be divided into parts also in its lateral direction.

In an embodiment of the invention the ballast tank is divided into at least two parts in the longitudinal direction, i.e. in the direction of the water surface. Thereby the position of the cargo space and its balance in relation to the water surface can be adjusted.

In an embodiment of the invention the apparatus is a watercraft, which comprises means of motion power such as an engine, and steering means for moving the apparatus independently on the surface of the water system. An apparatus such as this can operate completely independently.

In an embodiment of the invention the apparatus comprises attaching means for connecting a separate source of motion power, e.g. a pusher towboat, to the apparatus. These attaching means can be alike to those used in so-called pusher barges.

In an embodiment of the invention the collecting means comprise means for tilting the collecting platform in relation to the water surface of the water system. By turning, i.e. tilting, the collecting platform in relation to the level of the water surface of the water system to the desired position the directing of the material onto the collecting platform can be controlled.

In an embodiment of the invention the collecting means, which comprises a collecting platform and possibly means for moving the collecting platform, is a device which holds itself up on the water surface and which can be detached from the cargo space. A collecting means such as this is attached at its rear part to the front part of the cargo space for the duration of the collecting. Typically the rear edge of the collecting platform is arranged in a functional contact with the cargo space so that water which has been transferred over the collecting platform and/or material to be collected from it can easily pass into the cargo space. In an embodiment of the invention the collecting means is arranged as one inseparable object with the cargo space. In an embodiment of the invention the collecting means is a ramp arranged in connection with the front part of the cargo space. The ramp is kept low, e.g. horizontal, when material is collected from the surface of the water system. When the collecting is finished, the ramp is lifted. The position of the ramp in its part determines the capacity of the cargo space. In an embodiment of the invention the apparatus comprises an essentially horizontal flow edge of the cargo space. The water of the water system and/or material to be collected from it must pass over the flow edge before it can transfer into the cargo space. A collecting platform attached to the side of the cargo space or a rear part, attached to the cargo space, of a collecting platform could function as such a flow edge. It is also possible that the flow edge is a side or edge of the cargo space, separate from the collecting platform, placed between the collecting platform and the cargo space. The flow edge determines the height from above which the water of the water system and material to be collected can pass into the cargo space.

In an embodiment of the invention the flow edge of the cargo space simultaneously also functions as a collecting platform. Thus the apparatus according to the invention can be made very simple—the collecting platform can thereby comprise just the flow edge of the cargo space.

In an embodiment of the invention there are means for adjusting the height of the flow edge of the cargo space in relation to the cargo space. For example, the front edge of the cargo space or a part of the front edge or a collecting means arranged in connection with it can be arranged on rails or the equivalent to be moveable in a vertical direction. By directing the height of the flow edge the depth from which water and material to be collected is collected can be adjusted. On the other hand, adjusting the height of the flow edge or a collecting means arranged in connection with it may also change the maximum capacity of the cargo space—there can usually be liquid material in the cargo space only up to the height of its edges.

In an embodiment of the invention the height of the flow edge of the cargo space can be adjusted approximately along the whole height of the front edge of the cargo space. The lower the flow edge is lowered, the lower the draught of the apparatus can be arranged with the aid of the ballast tanks, if at the same time the flow edge is kept approximately at the level of the surface of the water system. Thereby even a large apparatus can be driven into shallow water. This is especially preferable for example in shore areas. On the other hand, the large storing capacity could in that case not be wholly utilized. If the flow edge of the cargo space is lowered more generously, e.g. 5-40 cm below the water surface of the water system, it is possible to collect also material which is below the surface of the water system, e.g. ice sludge.

In an embodiment of the invention the apparatus comprises means for creating a water jet and/or a steam jet. Water jets or steam jets that are directed with the aid of for example suitable pumps, pipes, tubes, hoses and nozzles can be used in many ways, for example for directing oil to be collected towards the apparatus according to the invention.

Cleaning oily ice is difficult with the present means. With the aid of the invention the ice can be washed, for example with the aid of steam or a water jet, for example on a grate platform placed on the collecting platform. Thereby the oily water flows through the grate floor of the collecting platform and onwards along the collecting platform into the cargo space. Ice can be directed onto the collecting platform and onto said grate platform for example with the aid of rails which are arranged mainly in the travelling direction of the apparatus from the front edge of the collecting platform onto the collecting platform. After the cleaning location the rails can be arranged to turn towards the sides of the device, so that the ice is directed back into the water system from the side of the device. On the other hand, a small amount of ice or sludge which has ended up in the cargo space does not typically impede the function of the invention. In an embodiment of the invention:

with the aid of the apparatus according to the invention water, ice and oil are collected from the water system onto the collecting platform, a water jet and/or steam jet is produced, either in the apparatus itself or through external means, ice on the collecting platform is rinsed with the produced water jet and/or steam jet, ice is directed back into the water system.

In an embodiment of the invention an oil-polluted shore is cleaned with the aid of the invention. In that case:

the cargo space and collecting platform is moved close to the oil-polluted shore, at least one oil boom or an equivalent oil controller is arranged from the collecting platform or its vicinity to the shore or the vicinity of the shore, water exhaustion means are used for generating a flow which passes through the cargo space, a water jet and/or steam jet is produced, the shore is cleaned with the produced water jet and/or steam jet, the oil which comes loose from the shore is directed to the surface of the water system and onwards onto the collecting platform and into the cargo space.

Such an application would come into question especially on shores that are difficult to reach and to which it is difficult to transport collecting equipment by land. Such are e.g. canegrass areas, shore areas that are becoming swampy and many islands. Such an application is also well suited for instance for cleaning harbour basins and other sheltered water areas. The apparatus can have oil booms or similar ready. The oil booms or similar can be arranged to be turned into a suitable position using hydraulic power. The water jet or steam jet can be produced in the apparatus according to the invention itself if it has suitable means. It is also possible that e.g. pressure cleaners are brought to the location by land. In an embodiment of the invention the apparatus comprises a reed cutter with the aid of which oil-polluted reeds and other waterside plants can be cut and collected.

In an embodiment of the invention the apparatus comprises means of producing hydraulic power as a source of power for the necessary moveable parts. In an embodiment of the invention water or environmentally friendly vegetable oil is used as hydraulic fluid at least during the warm season, whereby the collecting device itself would at least in this regard not be a threat to the environment even when damaged.

The apparatus according to the invention can be manufactured to a required size. Typically the cargo space can be for example 10-120 meters long, 3-25 meters wide and 1-5 meters high. The collecting platform is typically slightly narrower than the cargo space and for example 2-30 meters in length. If the collecting means is an in itself floating device that can be detached from the cargo space it is typically approximately of the same width as the cargo space and for example 3-30 meters in length.

The system according to the invention of collecting material from a water system comprises at least two apparatuses according to the invention and an emptying station for the cargo spaces of the apparatuses, situated on the shore. If there are several apparatuses it is possible to achieve a very effective and extensive oil-combating system even for a large area. The apparatuses can be arranged side by side, for example one or more apparatuses on each side of a towboat or other equivalent vessel, thereby getting a larger scanning field.

The system becomes especially inexpensive if the apparatuses as such are made low-price, for example similar to pusher barges without sources of movement power of their own. Thereby empty apparatuses could be deposited along the coast in a scattered manner. In a system such as this, when for example an oil spill happens, at least one apparatus can quickly be brought to the site. More empty apparatuses can then be towed to the site ready to wait for use. With one vessel that can be connected to the apparatuses, e.g. a pusher towboat, the cargo space of one apparatus can be collected full and a new empty apparatus can quickly be substituted for the full one. It is therefore not necessary to go to the harbour to empty the apparatus, whereby the collecting is remarkably more effective than in known solutions. Full apparatuses can for example be temporarily stored, for example left to float in the water in the vicinity of the site of the accident and they can be transported for emptying when there is time. As the largest advantages of the system according to the invention can be mentioned that:

An almost unbroken oil collecting is possible also far from the harbour, as long as there are enough storing barges available at the site.

The system has a very inexpensive purchase price.

The cleaning capacity is large.

The system is quickly ready for service.

The collecting apparatuses do not require manning when in standby mode.

The necessary energy sources are easily attainable in a pushing vessel.

In an application of the system and method according to the invention oil or other material to be collected is transferred from the water system into the floating cargo space and onwards onto land for further processing without pumping oil and without transferring the oil by mechanical contact, for example without brushes or conveyors. For example the material to be collected can be transferred from the water system into the cargo space in the manner mentioned above with the aid of the motion energy of flowing water. The oil or other material to be collected is transferred for further processing from the floating cargo space onto land for example by emptying the ballast tanks, whereby the cargo space rises and the oil or other material can be drained from the cargo space gravitationally. The cargo space or the whole apparatus can also be lifted into the air e.g. with a crane, whereby the oil or other material can be drained or poured e.g. into a storage reservoir by tilting the cargo space.

BRIEF DESCRIPTION OF THE FIGURES

The invention is described in more detail below with reference to the enclosed schematic drawing, in which.

DETAILED DESCRIPTION OF THE EXAMPLES OF THE FIGURES

The level 1 of the water surface of the water system is in all figures drawn with a solid line. For the sake of clarity, corresponding parts of different applications have the same reference numeral.

Figure 1:
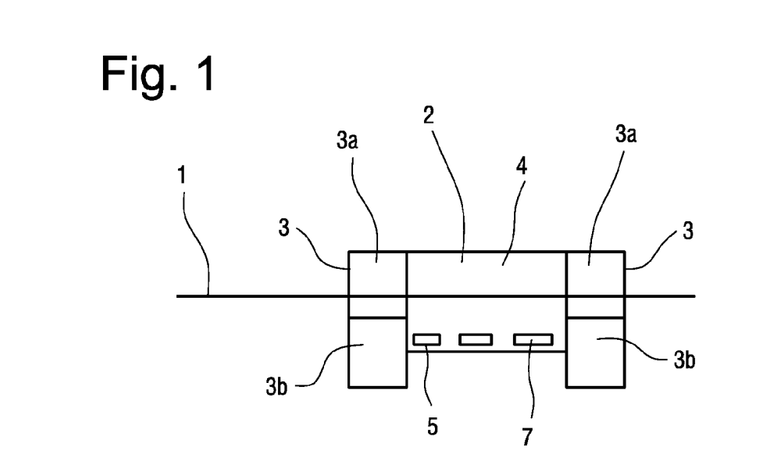
FIG. 1 shows a cargo space according to the invention seen from behind.

In FIG. 1 is shown, floating on the surface 1 of the water system, a cargo space 2 according to the invention seen from behind. On the sides of the cargos space 2 there are ballast tanks 3, which are divided into two parts 3a, 3b in the elevation direction of the cargo space 2, i.e. parallel to the water surface 1. In this example water is not pumped into the upper part 3a of the ballast tanks 3, but they are kept empty at all times and thereby they assure that the cargo space stays on the surface. Water is pumped into the lower part 3b and out of it to control the draught of the cargo space 2. In the bottom edge of the rear wall 4 of the cargo space there are three openings 5, which lead from the inside of the cargo space to the water system. The size of the openings can be adjusted with closing traps 7. Into the cargo space is drawn with a broken line the level 6 of the water surface inside the cargo space 2.

Figure 2:
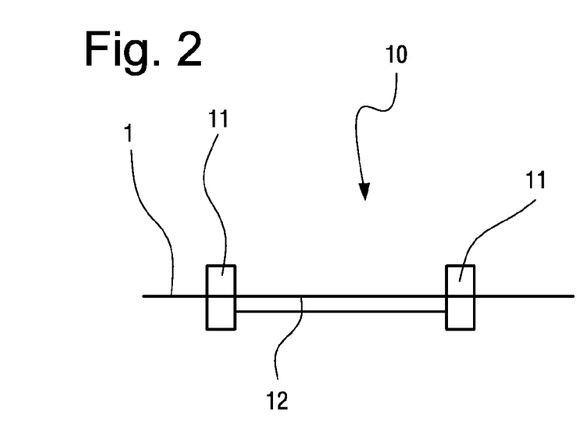
FIG. 2 shows a collecting means according to the invention seen from the front.

In FIG. 2 is shown, floating on the surface 1 of the water system, a collecting means 10 according to the invention seen from the front. On the sides of the collecting means 10 there are ballast tanks 11, which function as a supporting frame of the collecting means. Between the ballast tanks 11 there is arranged a collecting platform 12. In FIG. 2 can be seen how the collecting platform is somewhat below the water surface 1. The collecting platform 12 is typically arranged mainly horizontally somewhat below the water surface 1, whereby the water and oil passing through the collecting means 10 pass over it. The collecting platform 12 attenuates the undulating of the water on top of it, thus improving the cleansing effect. The collecting platform 12 also stabilizes the travel of the cargo space 2 and the collecting means 10 of for example catamaran-framed vessels. It is also possible to design the collecting platform 12 so that it for its part functions as a mechanic control unit of water and oil. The collecting platform 12 is preferably attached to the rest of the device 10 by means, e.g. hydraulic cylinders, which allow for the adjusting of the inclination and height of the collecting platform 12 in relation to the water surface 1. Typically the collecting platform 12 is held 50-1000 mm, or 300-700 mm below the water surface 1. The collecting platform 12 is also useful when the invention is used in icy waters. Thereby the collecting platform 12 can be positioned for example leaning slightly forward so that the ice rises along it or along the rail elements or conveyors installed on it at least partly above the water surface 1. With the water jets or steam jets according to the invention ice fragments travelling over the collecting platform 12 can be rinsed, whereby at least a part of the oil stuck to the ice is recovered with the apparatus 20.

Figure 3:
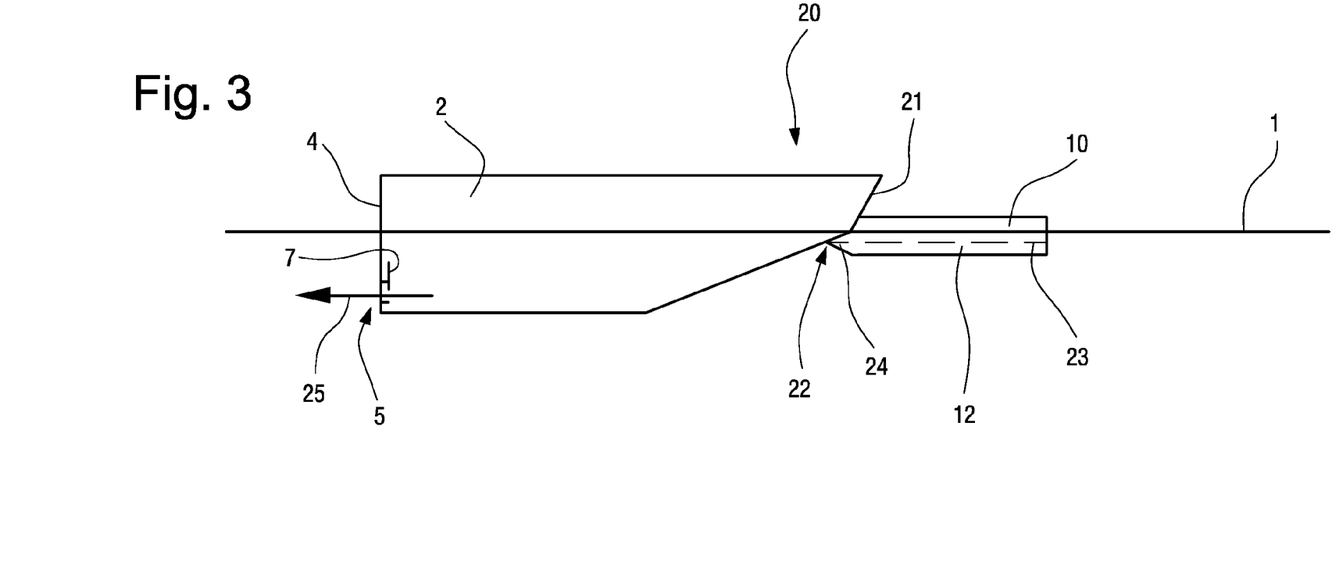
FIG. 3 shows an apparatus according to the invention seen from the side.

In FIG. 3 is shown how the cargo space 2 and collecting means 10 shown in FIGS. 1 and 2 form, when connected together, an apparatus 20 according to the invention for collecting material from a water system. The collecting platform 12 can be tilted backwards or forwards in the travelling direction of the device. In the situation of FIG. 3 the collecting platform is substantially horizontal and somewhat below the water surface 1. Between the collecting means 10 and the cargo space 2, there has been formed on the front wall 21 of the cargo space a flow edge 22 of the cargo space. It is on the same level as the collecting platform 12. As is seen in FIG. 3 the water surface inside the cargo space is at the same level as the water surface 1 of the water system. In the apparatus 2 of the figure the sources of motion power are for the sake of clarity not shown. For example in the cargo space, engines and devices of movement power such as propellers and control devices can be arranged for moving the apparatus 20 independently. In the rear wall 4 of the cargo space there could also be attaching means for connecting a separate source of motion power, for example a pusher towboat, to the apparatus.

When oil is collected from the water surface 1 using the apparatus 20 of FIG. 3, it works as follows: The apparatus 20 is moved in its travelling direction, in FIG. 3 from left to right. Water and oil on its surface is directed from the front edge 23 of the collecting platform 12 situated between the ballast tanks 11 onto the collecting platform and onwards due to the effect of the movement between the apparatus and the water system towards the rear edge 24 of the collecting platform, which is attached to the flow edge 22 of the cargo space. Water and oil on its surface 1 pass due to the effect of said movement between the apparatus 20 and the water system over the flow edge 22 of the cargo space into the cargo space 2, where the surface of the collected water and oil is on the same level as the surface 1 of the water system, so despite the name of the flow edge 22 the material to be collected does not flow but passes over it. When the apparatus 20 moves, the flows of the water cause an under pressure at the rear wall 4 of the apparatus, which under pressure draws water out of the cargo space 2 through the openings 5. This exiting water is depicted with an arrow 25. The exiting water makes room in the cargo space 2 for entering water and material to be collected. These water flows can be directed by changing for example the following variables: The velocity of the apparatus 20, the position of the closing traps 7 of the openings 5, the height of the flow edge 22 of the cargo space and the collecting platform 12 from the surface 1 of the water system, the draught of the cargo space 2. When the cleaner water in the lower part of the cargo space is pumped back into the water system according to need, more and more oil or other material to be collected is concentrated into the cargo space 2 when using the apparatus 20.

Figure 4:
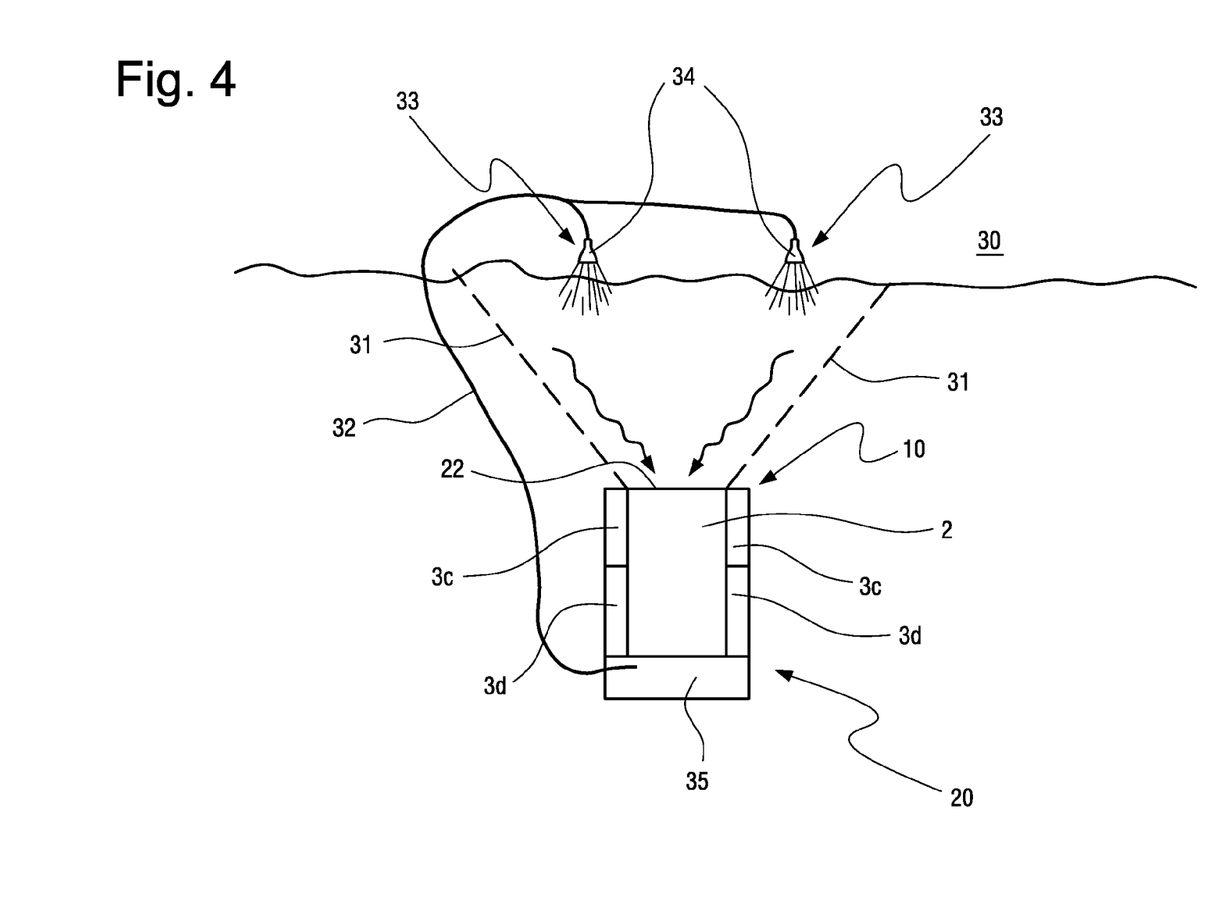
FIG. 4 shows another apparatus according to the invention seen from the top.

FIG. 4 shows an embodiment of the invention as depicted from above, where the apparatus 20 has been brought close to an oil-polluted shore 30. In the apparatus of FIG. 4 the storage tank 2 and the collecting means 10 have been designed as one and the same device. In the case of FIG. 4 the collecting means 10 and at the same time the collecting platform consist only of the flow edge 22 of the cargo space, which flow edge is placed right at the front edge of the apparatus 20. Thus the apparatus 20 has been made light, small-sized and easy to transport close to the shore 30. On the sides of the apparatus 20 there are ballast tanks, which are divided in the longitudinal direction of the cargo space into two parts 3c, 3d, whereby in addition to the draught also the inclination of the cargo space can be changed. From close to the front edge of the apparatus 20 there have been arranged two oil booms 31 to the shore to restrict the spreading of the oil and to help in directing it into the apparatus 20. The apparatus 20 has a technical part 35, wherein is situated a pump or the equivalent for taking water from the water system and producing a high pressure water jet. Pressured water is lead from the pump to hoses 32. At the end 33 of the hose are arranged nozzles 34. With the aid of pressured water spurting out from the nozzles oil is washed from the shore towards the water system. Oil that has ended up on the surface of the water drifts according to the invention and in the way shown by arrows into the cargo space 2. The technical part 35 also comprises the source of motion power of the apparatus 20, for example a water jet engine.

Figure 5:
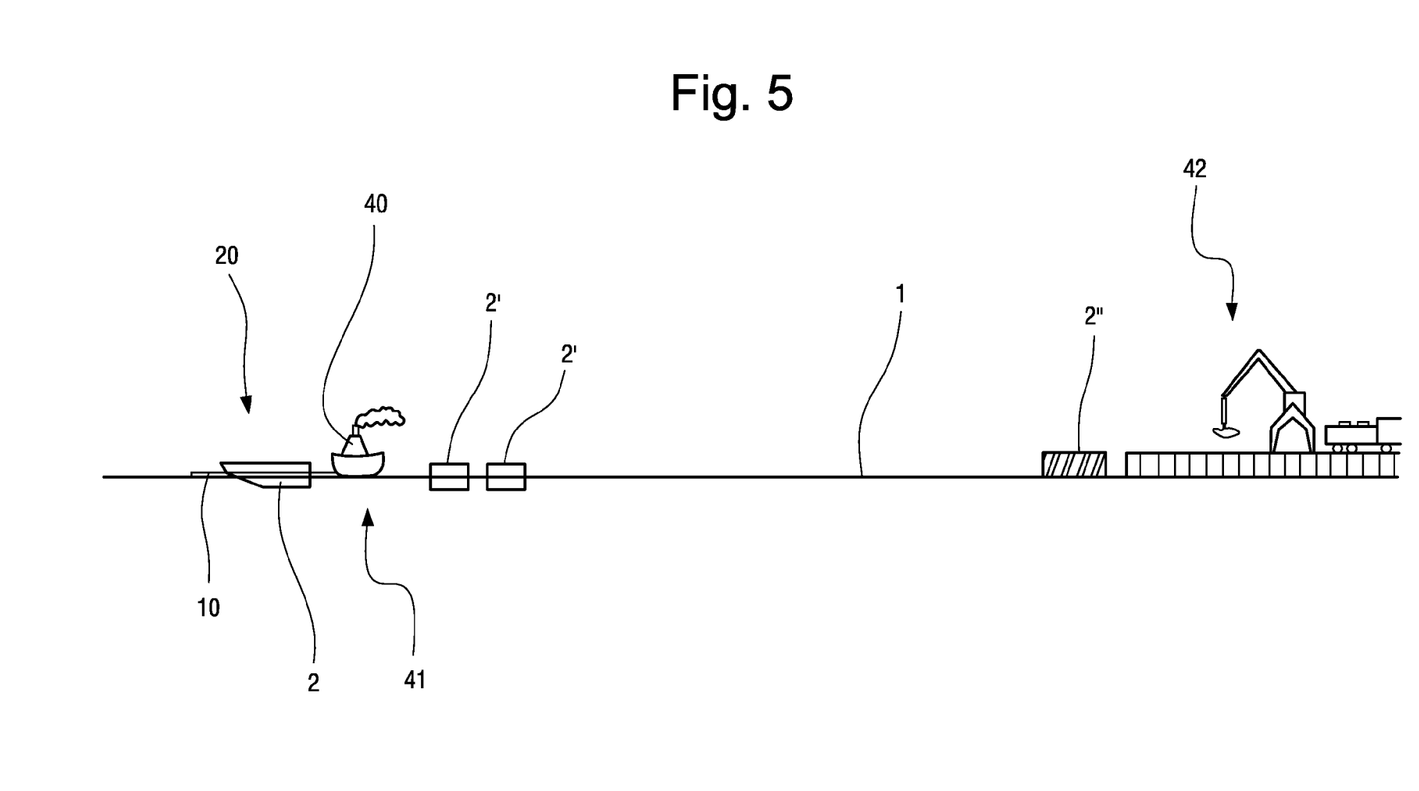
FIG. 5 shows a system according to the invention, and In FIGS. 6 and 7 are shown an apparatus 20 according to an embodiment of the invention.

In FIG. 5 is shown a system according to the invention for collecting material from a water system. In the situation of FIG. 5 the material to be collected is oil, which has come to flow into the water area 41 in the left edge of FIG. 5. At the accident site 41 is shown one apparatus 20 according to the invention currently collecting oil, which apparatus comprises a collecting means 10, a cargo space 2 and a pusher towboat 40 pushing them. Two empty cargo spaces 2' have been brought to the accident site 41. One full cargo space 2" has been brought to the shore, to the pier of the emptying station 42 of the cargo spaces. The cargo spaces 2, 2', 2" are detachable and re-attachable from the collecting means 10 and the pusher barge 40. Typically the cargo spaces 2, 2', 2" are always filled to a certain degree of admission, after which the full cargo space is detached and exchanged for another, empty cargo space, which is attached between the pusher barge 40 and the collecting means 10. According to the invention a full cargo space 2" can be transported for storing or emptying, for example to the emptying station 42. After the emptying the first, now empty cargo space can again be connected to be part of an oil-collecting apparatus 20. With this arrangement a non-stop type of collecting logistics can be achieved. The apparatus 20 can be in constant use in the oil-polluted water area 41, only the cargo spaces 2 are exchanged for empty ones when needed. Barge-like cargo spaces 2 are inexpensive to produce, so there can be many of them ready in case of a catastrophe.

If the cargo spaces 2 comprise means for pumping water to the bottom of the cargo space, the cargo spaces 2 can conveniently be emptied at the emptying station 42 for example as follows: Water is pumped to the bottom of the cargo space that at least partially contains collected material, whereby the water lifts the material in the cargo space 2 which material is lighter than water, such as oil, upwards. The upwards-rising oil can thus easily be led, for example gravitationally, for further processing. According to a preferred embodiment the ballast tanks are lightened, whereby the cargo space 2 rises and the oil or other material can gravitationally be spilled out. In the system and method according to the invention oil or other collected material can thus be moved from the water system 1 to the cargo space 2 and onwards onto land for further processing 42 wholly without the oil having to be pumped and without having to move the oil by mechanical contact.

It is possible that the cargo spaces 2 according to the invention themselves comprise means for separating water from oil and means for leading the water out of the storage tank. Storage tanks such as these can for example comprise several so-called settling tanks (not shown), through which the oily water is circulated. The cleaner water in the lower parts of the settling tanks is thereby pumped back into the water system according to need. The settling technique as such is previously known, and will thus not be explained further here.

Figure 6:
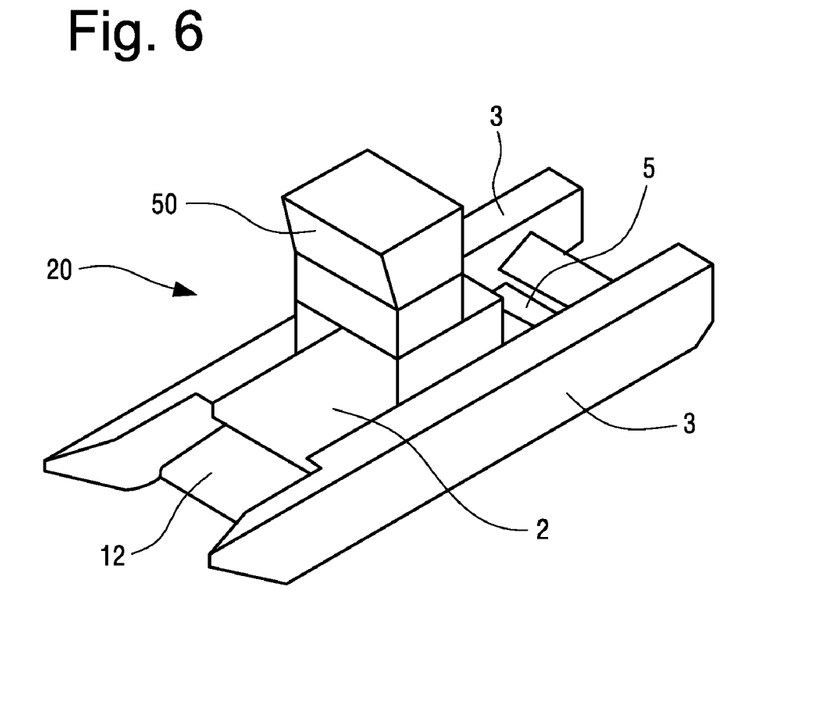
Figure 7:
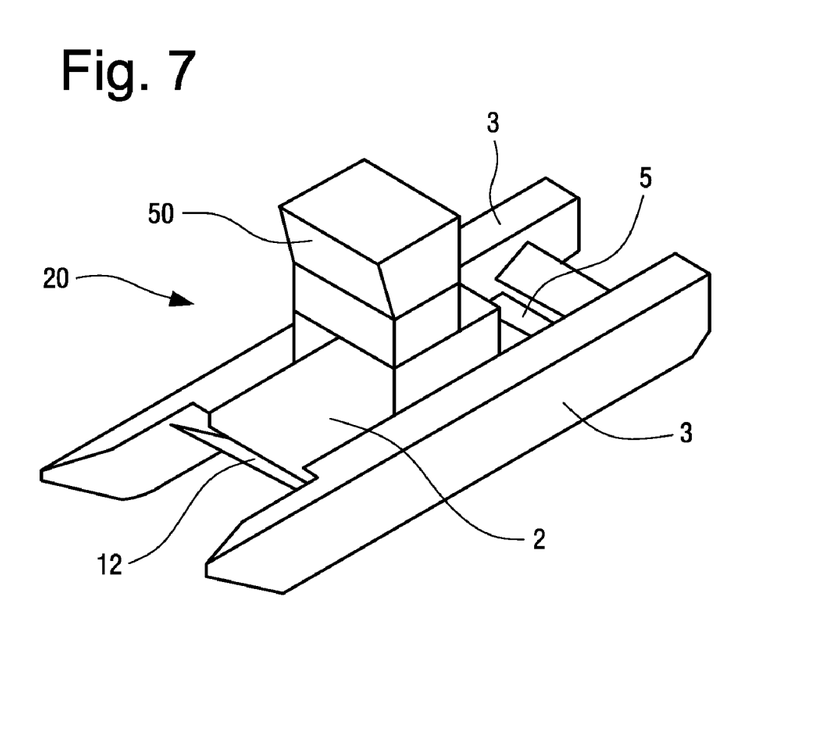

In FIGS. 6 and 7 is shown an apparatus 20 according to an embodiment of the invention. This apparatus 20 is a vessel, which comprises a cargo space 2, ballast tanks 3, a collecting platform 12 and an engine and a cabin 50. The vessel 20 can function wholly independently. In the rear part of the vessel 20 there are water exhaustion means 5 for removing water from the cargo space. In FIG. 6 the collecting platform 12 is lowered into the collecting position and in FIG. 7 it is lifted into the transporting position.

Only one advantageous embodiment of the invention is shown in the figures. The figures do not separately show things that are of secondary value to the main idea of the invention, which things are known as such or apparent as such to a man skilled in the art, such as power sources, pumps, support structures possibly needed by the invention, actuators needed for emptying and filling the ballast tanks or attaching mechanisms of the barges, towboats or other vessels. It is apparent to a man skilled in the art that the invention is not limited exclusively to the examples described above, but that the invention can vary within the scope of the claims presented below. The dependent claims present some possible embodiments of the invention, and they are not to be considered to restrict the scope of protection of the invention as such.

The invention claimed is:

1. An apparatus which is floatable and movable on a surface of a water system for collecting material therefrom, wherein the apparatus comprises:

a cargo space having forward and rearward walls for storing the material collected from the water system surface therewithin, at least one ballast tank which is divided into at least two separate parts, wherein water from the water system may be introduced into one of the separate parts of the at least one ballast tank so as to controllably alter cargo space draught in the water system and thereby maintain the collected material within the cargo space at a level which is the same as the water system surface, a collecting assembly including a collecting platform connected to the cargo space forwardly of the forward wall thereof, and an adjustment device for adjusting the collecting platform in relation to the water system surface so the collecting platform is maintained at a desired height below the water system surface, wherein the collecting assembly receives water of the water system and material to be collected therefrom as the apparatus moves in a forwardly direction through the water system, and directs the received water of the water system and material to be collected therefrom into the cargo space, and wherein the water of the water system and material to be collected therefrom pass over the collecting platform before passing into the cargo space; and water exhaustion means comprising openings in the rearward wall of the cargo space which are positioned below the water system surface for allowing water to be exhausted from the cargo space, wherein movement of the apparatus in the forwardly direction responsively causes an under pressure condition to exist rearwardly of the rearward wall of the cargo space to thereby draw water received in the cargo space through the openings and be removed therefrom, whereby material collected from the water system surface is retained in the cargo space.

2. The apparatus according to claim 1, wherein the at least one ballast tank is divided into the at least two separate parts in a longitudinal direction of the cargo space.

3. The apparatus according to claim 1, wherein the at least one ballast tank is divided into the at least two separate parts in an elevational direction of the cargo space.

4. The apparatus according to claim 1, wherein the collecting assembly is connected to the forward wall of the cargo space to allow for tiltable movement of the collecting platform in relation to the water system surface.

5. The apparatus according to claim 1, wherein cargo space includes gripping means selected from the group consisting of nets, ropes, railing, grate platforms and steps for humans arranged on an upper surface of the collecting platform.

6. The apparatus according to claim 1, further comprising nozzles for creating a water jet and/or a steam jet to encourage material to be collected from the water system surface to move towards the collecting assembly.

7. A system for collecting material from a water system, wherein the system comprises at least two apparatus according to claim 1, and an emptying station positioned on a shore to allow for emptying of the cargo space of each apparatus.

8. A method for collecting material from a surface of a water system comprising:
(a) placing a cargo space in the water system,
(b) causing water from the water system and material to be collected therefrom to be transported over a collecting platform associated with a collecting assembly attached to a forward wall of the cargo space before passing into the cargo space,
(c) controllably positioning the collecting platform such that the collecting platform is positioned at a desired level below the water system surface,
(d) adjusting draught of the cargo space by allowing water from the water system to be introduced into at least one ballast tank thereof so that the material collected from the water system surface and retained within the cargo space is at a level which is the same as the water system surface,
(e) removing water from the cargo space so that material collected from the water system surface is retained therein, and
(f) transferring the collected material in the cargo space to a land-based collection facility, wherein
steps (b) and (f) are practiced without pumping or mechanically moving the collected material by contact.

9. The method according to claim 8, wherein step (c) includes adjusting inclination of the collecting platform to a desired position in relation to the water system surface.

10. The method according to claim 8, the material to be collected from the water system surface is ice, and wherein the method further comprises:
producing a water jet and/or steam jet which is directed onto ice on the collecting platform so that the ice thereon is rinsed with the produced water jet and/or steam jet, and is thereafter directed back into the water system.

11. The method according to claim 8, which comprises:
moving the cargo space and the collecting assembly in close proximity to an oil-polluted shore,
arranging at least one oil boom in a vicinity of the collecting platform and the shore,
generating a flow of water which passes through the cargo space,
producing a water jet and/or steam jet and directing the water jet and/or steam jet against the oil-polluted shore to thereby cause the oil on the shore to become loose such that the oil floats on the surface of the water system and is directed onwards into the collecting assembly for collection by the cargo space.

12. The method according to claim 11, wherein step (e) is practiced by moving the cargo space in a forwardly direction to responsively cause an under pressure condition to exist rearwardly thereof to thereby draw water within the cargo space through openings in a rearward wall of the cargo space and be removed therefrom.

* * * * *